Figure 1:
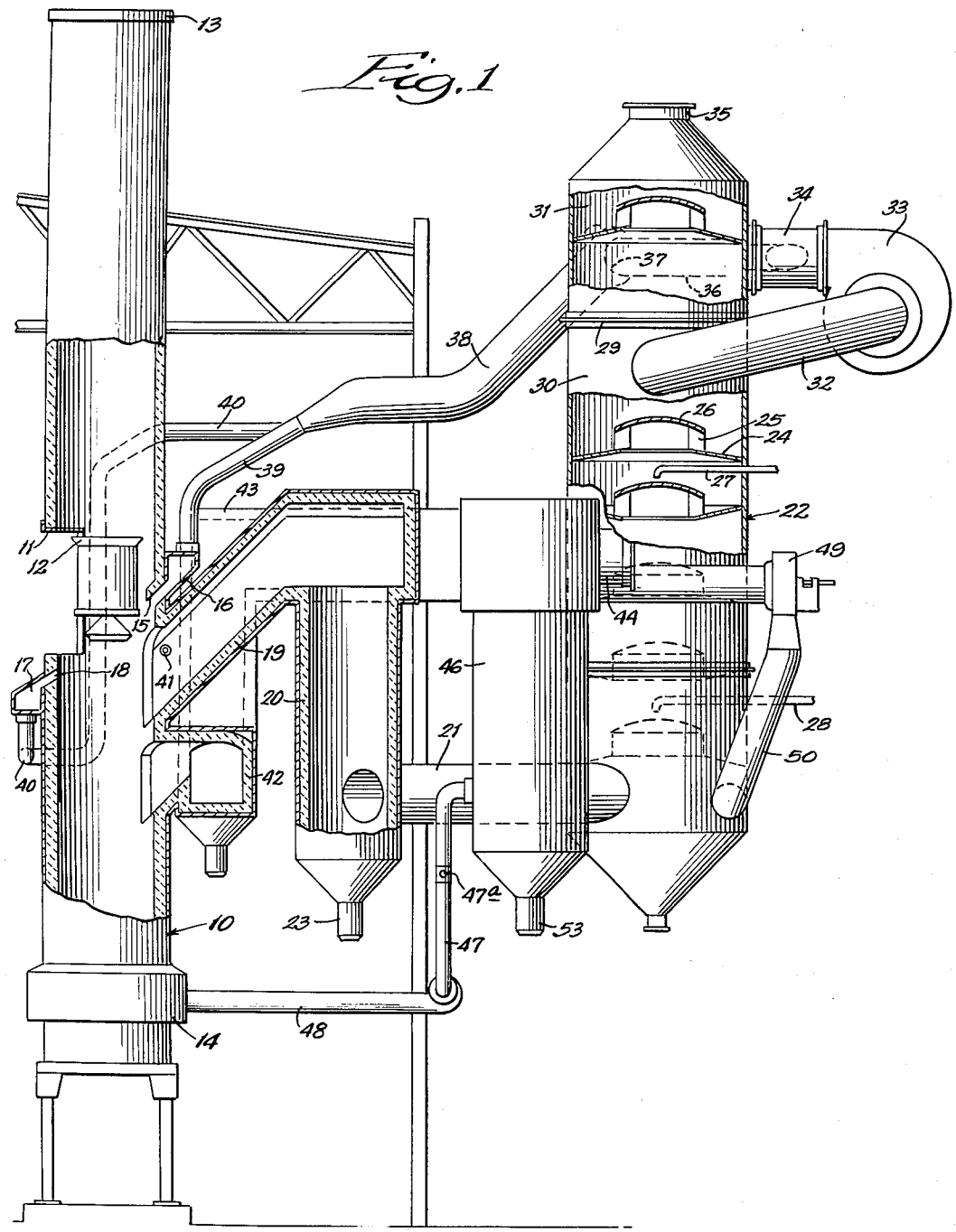

May 22, 1956 C. B. SCHNEIBLE ET AL 2,746,858
CUPOLA FURNACE AND METHOD OF TREATING GASES THEREFROM
Filed Feb. 9, 1953 2 Sheets-Sheet 1

INVENTORS:
Claude B. Schneible
and Raymond H. Moore,
BY Dawson, Tilton & Graham,
ATTORNEYS.

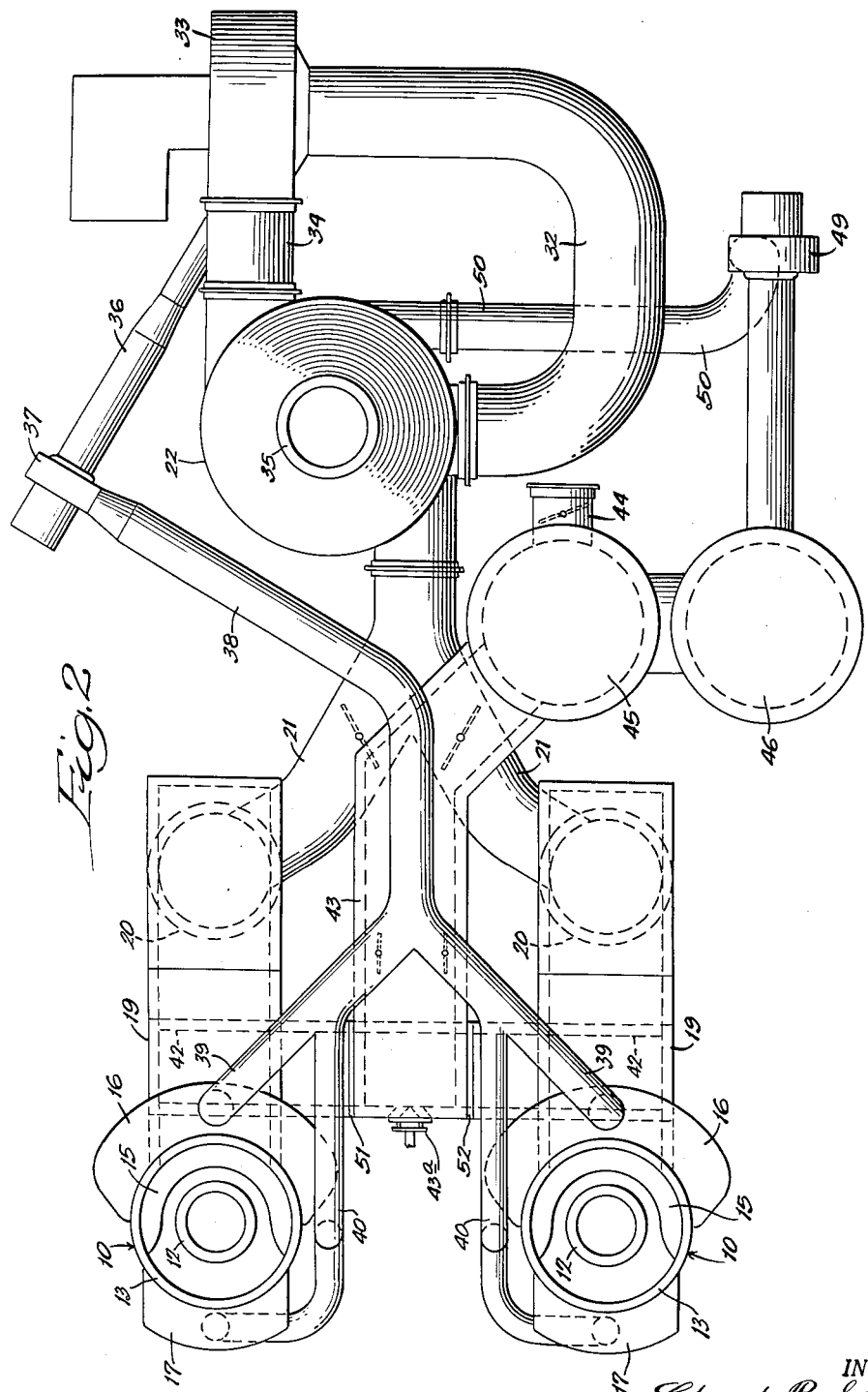

United States Patent Office 2,746,858
Patented May 22, 1956

2,746,858

CUPOLA FURNACE AND METHOD OF TREATING GASES THEREFROM

Claude B. Schneible, Detroit, and Raymond H. Moore, Birmingham, Mich., assignors to Claude B. Schneible Company, Inc., Detroit, Mich., a corporation of Michigan Application February 9, 1953, Serial No. 335,832

13 Claims. (Cl. 75—43)

This invention relates to hot blast gas treatment, and more particularly to a treatment in a cupola or other melting structure in which the products of combustion are treated in a novel manner.

In designing equipment for cupolas and similar metal melting structures, it has been difficult to determine, for the purpose of the design, the character and quantity of the products of combustion from the cupola, etc., because of the many variable conditions, such as, for example, the melting ratio, which may vary from four pounds of iron to one pound of coke to as high as thirteen pounds of iron to one pound of coke.

When iron is mixed with the fuel that descends in the cupola stack, as the fuel is consumed at the base of the stack, much of the excess heat is utilized in preheating, melting and superheating the iron and is not available to supply the heat energy for the endothermic reaction of reducing the carbon dioxide to carbon monoxide. In order to apply equipment in general for handling the products of combustion, it is necessary to determine the character of the gas, because should the gas ignite in the duct work and combustion chamber prior to entering other equipment such as the dust collector or wet scrubbing column, a considerable amount of heat would be released which must be dissipated by quenching with water. This produces water vapor and the capacity of the dust-arresting equipment, as well as the duct work, must provide for handling the water vapor as well as air and other gases.

In the ordinary cupola operation, a charging door is provided approximately twenty feet above the bed plate of the cupola. Coke and iron are introduced through this door, usually by means of mechanical bucket charging equipment. The charging bucket is inside the cupola for a very brief time and then is withdrawn mechanically and reloaded for the next charge. The bucket may be within the cupola only for one-fourth to one-half a minute, while for the remaining time it is outside and the cupola stack is open.

The products of combustion ascend from the tuyere zone near the bottom of the cupola through the combustion zone and up through the charge. The temperature of the products of combustion emerging from the top of the charge will vary from about 200° F., with a very high iron to coke charging ratio, to as high as 1150° F. with a low iron to coke charging ratio. The percent volume of carbon monoxide in the products of combustion as emitted from the top of the charge will vary from 10%, with a high iron to coke charging ratio, to as much as 26% with a very low iron to coke charging ratio, and with a corresponding variation in the latent heat content of the gases.

Most of these gases will burn very readily above the top of the charge, which multiplies their volume as their temperature increases, thus vastly increasing the problem of arresting the dust and fumes normally expelled from the top of the cupola stack.

There has long been a need for cupola equipment which will permit the top of the cupola to be left open for emergency discharge of such fumes and dust, etc., while normally withdrawing said dust and fumes with the products of combustion and arresting them so that the gases may be discharged in the atmosphere without harm to the neighborhood while at the same time re-utilizing some of the gases. There has long been a need for a structure which enables the gases withdrawn in this manner and which contain little free oxygen to be re-used in providing a gaseous seal for the cupola and while also using gases rich in combustible material for a secondary combustion before the gases are combined with the first gases in a scrubbing or cleansing operation. In such a process, it is desirable to separate gases rich in latent heat and combustible material and by adding oxygen to the captured rich gases to consume the same in a secondary combustion whereby these gases, after serving to preheat primary air, are combined with gases poor in oxygen and carbon so that the two gases may be washed and then one stream thereof re-utilized in the treating operation by forming a curtain of gases across the cupola interior.

It is desired to take advantage of both sensible and latent heat content in the products of combustion to preheat the blast air that is introduced at the tuyeres, while providing a second exhaust opening in the cupola and maintaining there-over a gaseous curtain. By the foregoing, it is possible to obtain two streams of gases which, just prior to entering the wet scrubbing column, are poor in combustibles and oxygen and which, after scrubbing contact with liquid, may be removed for re-use in the process or for venting to the atmosphere. At the same time, should there be a power failure, etc., and should the fans, etc. be shut off, the above products of combustion within the cupola are free to rise through the stack of the cupola and be discharged from the top thereof as in the usual cupola operation. The cupola thus continues to operate and no damage is done to the equipment and repair can be made readily.

An object of the invention is to provide a cupola or metal melting structure which, in case of power breakdown, will operate normally, discharging the products of combustion through the stack of the cupola, while in the general operation gases are withdrawn from different points in the cupola and after treatment released from a gas-cleansing column enabling the gas poor in free oxygen to be returned for re-use in the process as a gas curtain extending across the cupola. Another object is to provide a gas curtain in a cupola directing products of combustion to a dust collector while also directing another portion of the products of combustion which are rich in latent heat and carbon to a combustion chamber where the gases are ignited and the combustibles consumed, thereafter taking the remaining gases to the dust collector for blending with the first gases and for treating the gases by contact with liquid. A still further object is to provide an improved cupola apparatus having important new advantages and accomplishing new results. A still further object is to provide a method of gas treatment in which two streams are treated differently, utilizing both a stream poor in carbon and oxygen and a stream rich in carbon, the latter being consumed in a combustion chamber, and the gases therefrom, now poor in combustible matter, being combined with the first stream for treatment to remove foreign material therein and for re-use in the process. Other specific objects and advantages will appear as the specification proceeds.

The invention is shown, in an illustrative embodiment, by the accompanying drawings, in which—

Figure 1 is a side elevational view of apparatus embodying our invention, a portion of the apparatus being shown in vertical section; and Fig. 2, a top plan view.

In the illustration given, 10 designates a cupola. As shown more clearly in Fig. 2, a pair of cupolas 10 may be arranged together. The cupola 10 is of well known construction and need not be described in detail. The numeral 11 indicates the charging door or inlet for the charge, and 12 designates the usual bucket which is shown placing a charge within the cupola. The top of the cupola is designated by the numeral 13, and the stack is always open at its top. Near the bottom, the cupola is provided with the usual tuyeres 14.

At a point about even with the charging door, we provide the stack 10 with an inwardly-extending flange 15. In order to permit an adequate downward velocity with a minimum volume of "control air," the flange 15 is extended into the cupola as far as practicable while permitting ample clearance for the charging bucket. The flange thus reduces the area of the stack through which the control velocity is maintained.

We provide air hoods about the stack 10 and near the door 11 so as to form a diagonal curtain of gas extending across the cupola interior. A semicircular hood 16 discharges gas downwardly about the rear half of the cupola while another hood 17 is provided with a port 18 discharging gas upwardly toward the first-mentioned hood 16 and slightly inwardly so as to form a gas curtain closing off the cupola along a diagonal line. A duct 19 leaves upwardly and outwardly at an angle of about 45° from a point below the flange 15 and the hood 16, whereby products of combustion which are relatively poor in carbon and oxygen may be withdrawn through the duct 19 and thence downwardly through the chamber 20 and laterally through the duct 21 into the scrubbing apparatus or column 22. If desired, the chamber 20 may be provided with an ash-ejecting receptacle 23.

The scrubbing column or dust collector 22 may be of any suitable type or structure. We prefer to employ a collector similar to that shown in my Patent 2,197,595. The column is provided with baffles consisting of rings 24, vanes 25, and plates 26. Water or other liquid is introduced into the tower through the upper pipe 27. When the gases introduced into the bottom of the tower are extremely hot, we prefer to introduce water through a second pipe 28 above the first baffle therein.

Near the upper end portion of the column, we provide a partition 29 which divides the tower into a lower main compartment 30 and an upper secondary entrainment chamber 31. A pipe 32 leads from the lower chamber 30 to a fan housing 33 and from thence is driven under positive pressure by the fan through duct 34 into the upper entrainment chamber 31. Bleed lines (not shown) convey liquid condensate from the upper chamber 31 into the lower chamber 30. From the upper chamber, a portion of the gases may be vented through the outlet 35. A duct 36 leads a portion of the gases from the fan duct 34 through a fan 37 and directs them downwardly through duct 38 and the smaller ducts 39 and 40 to the hoods 16 and 17, respectively. Thus, gases from the column 22 may be re-utilized in the forming of the gaseous curtain across the interior of the cupola 10. If desired, a portion of the gases passing through the conduit 19 may be burned and an inextinguishable burner 41 may be placed in the exhaust outlet pipe 19.

At a point below the exhaust pipe 19, we provide another draw-off conduit 42 which is refractory lined and directs the hot gases to a combustion chamber 43. The draw-off or exhaust opening 42 is located at a point where it will withdraw air rich in carbon. These gases pass an igniter 43a provided with a proportional air inlet producing a constant burning of these gases in the combustion chamber. The hot gases pass to a heat exchanger 45 and thence to a second heat exchanger 46. At the upper part of heat exchanger 45, I provide a valve or damper or bleed-in air gate 44. This location in the upper part of heat exchanger 45 permits the maximum travel of the inflammable gases and the maximum time for their burning before being chilled by bleed-in air. Blast air for the cupola passes through each of the heat exchangers and is returned through pipes 47 and 48 to the tuyeres of the cupola. Preferably the blast is supplied to the cupola by a high pressure blower which delivers the proper quantity of blast air to the heat exchanger at a desired pressure.

After the hot gases have passed through the heat exchangers 45 and 46 and are substantially cooled by giving up their heat energy to the blast air, they then pass through a centrifugal fan 49 which introduces the flow of the hot gas tangentially into the collector 22 and through the pipe 50.

The air blast gates 51 and 52 are for the purpose of selecting one or the other of the cupolas for operation. The equipment shown is arranged to handle the gases from only one cupola operating at a time, and by closing gate 51 and opening gate 52, the equipment is set for the operation of the cupola shown on the right-hand side of the view in Fig. 2, while a reverse operation of the gates will set the equipment for the operation of the cupola shown on the left-hand side of the view.

In pipe 47, we provide a thermostat 47a which controls, through electrical connections, the operation of the bleed-in gate 44. Thus the quantity of air admitted is automatically controlled by a selected setting of the thermostat in the preheated blast air duct 47. The hot gases are drawn into the conduit 42 which, by the opening of the gates 51 or 52, is arranged in operative position and the gases enter combustion chamber 43. At this point, secondary air is admitted so that the flame can be maintained by the igniter 43a which, as stated, is provided with a proportional air inlet. The combustion chamber 43, together with that portion of the combustion chamber which is contained in the upper part of the heat exchanger 45, is of sufficient volume for complete combustion of the gases. In heat exchanger 45, the gases are then drawn downwardly through heat exchanger tubes but, just prior to entering these tubes, such gases are diluted with the said bleed-in air controlled by said thermostat so as to moderate their temperature to that which is necessary to maintain the proper temperature of blast air coming in from the heat exchanger through pipes 47 and 48 to the tuyeres. An advantage of this arrangement is that the temperature of the gases entering the heat exchanger tubes is positively controlled so that under all conditions of operation or during shut-down periods, the temperature can never exceed the safe operating range of the material of the tubes.

In the usual operation of hot blast heat exchangers, the temperature of the hot blast air is controlled by admitting more or less oxygen-bearing secondary air and gas temperatures as high as 2,000° F. are experienced in the normal operation of such equipment, as at times of shutdown or reduced melting rate, because of the difficulty of excluding oxygen-bearing air sufficiently during these periods and also because of the differences in carbon monoxide percentages of the gas under varying conditions. In the construction shown, the quantity of weight in pounds per minute of gases drawn through the heat exchanger is constant with a given fan performance, so that when additional bleed-in air is admitted, less inflammable gases are drawn from the cupola, thus providing a very positive control of the temperature of the gases passing through the heat exchanger. In a given operation and capacity, this temperature would not exceed 1,200° F. for maximum melting rate and will automatically be reduced to as low as 800° F. for reduced melting rate and reduced blast air volume when maintaining approximately 500° F. blast air preheat.

Each of the heat exchangers 45 and 46 may be provided with cone bottoms for discharging ash into ash ejectors 53. The heat exchangers may be of any suitable construction enabling the blast air to be passed countercurrent or in heat exchange relation with the exhaust gases. Since such structures are well known, a detailed description is herein believed unnecessary.

Operation

In the operation of the apparatus, the cupola is closed by a gaseous curtain while products of combustion of the cupola which are rich in combustible material are drawn off through the lower exhaust outlet 42 and ignited within a combustion chamber in the presence of added air. The hot gases from the combustion chamber are then passed successively through two heat exchangers, where they are in heat-exchange relation with incoming air which is delivered under pressure to the tuyeres of the cupola. The hot gases from the combustion chamber 43, after being diluted with outside air to a controlled temperature and cooled by the transfer of their heat to the blast air, are passed into the bottom of the wet scrubbing column 22. Here they are blended with a stream of gases drawn off from the cupola below flange 15 through duct 19. The latter stream is passed directly through the chamber 20 and duct 21 (without burning) into the bottom of the tower or column 22. The blended streams of gases are drawn upwardly through the tower in contact with liquid introduced into the tower through pipes 27 and 28. From the top of the chamber 30, the gases are passed through the exhaust fan and then are positively forced by the fan into the upper compartment 31. Under the slight pressure to which the gases are now subjected, there is a continuation of moisture therefrom and the liquid is passed through perforations in plate 29 into the chamber below. If desired, some gases may be released to the atmosphere through outlet 35 or discharged for any other use. A portion of the cleansed gases are withdrawn from duct 34 (before entering the chamber 31) and passed through fan 37, duct 38, and the divided ducts 39 and 40, to the hoods 16 and 17. Such gases are re-used in the forming of the gaseous shut-off curtain.

In the foregoing operation, we take off gases rich in latent heat and carbon monoxide and then, by adding oxygen, consume these gases, utilizing the hot gases from the combustion chamber for preheating blast air going to the tuyeres. At the same time, we draw off gases poor in combustible material and pass said gases directly to the bottom of the wet scrubbing column. Here the gases from the two sources are blended and pass upwardly countercurrent to the liquid in the column. In the process, we capture the overage of gas not taken to the combustion chamber and thus prevent the addition of oxygen to such gases which are not burned but pass directly to the collection column.

In addition to the air gates 51 and 52, it will be understood that other suitable dampers will be employed in the various lines or conduits for controlling the flow of gases. For example, a damper may be employed in pipe 21 leading from chamber 30 to the scrubbing tower for the selection of one cupola or the other. In operating equipment for one cupola or the other, there are ordinarily three pairs of dampers or gates which must be properly set. The dampers are in pipe 21, exhausting the weaker gases from the cupola directly to the scrubbing tower and in draw-off conduit 42 for drawing the richer gases from the proper cupola, and in pipe 38 for directing the return of washed gases to the air curtain.

At all times, the cupola stack 13 is left open so that, should there be a power failure, the expensive equipment is protected immediately in that the curtain and suction exhaust immediately cease to exist and the products of combustion from the cupola flow upwardly and naturally through the stack outlet 13. The fans exhausting the gases from the cupola and forming the gaseous curtain may also be controlled by other apparatus showing water failure, etc., so as to cause the products of combustion to pass directly up the stack in the instance of power failure, water failure, etc. For the period of time of such a shutdown of the exhaust equipment, the gases and dust would be expelled from the top of the cupola just as in the operation of the normal cupola and the exhaust equipment could then be repaired without danger and without hazard of destruction of any of the parts.

The very great advantage of the structure shown can be appreciated when it is realized that in order to capture the products of combustion by closing the top of the cupola and exhausting all products of combustion and control air entering the charging door opening, with the same size cupola and same quantity of products of combustion, this would require exhausting approximately three times as much gas per minute from the top of the cupola to prevent the gas from escaping through the charging door opening.

While, in the foregoing specification, we have set forth a specific structure in considerable detail for the purpose of illustrating an embodiment of the invention, it will be understood that such details of structure may be varied widely by those skilled in the art without departing from the spirit of our invention.

We claim:

1. In cupola apparatus providing a hollow column open at its top, means for providing a gaseous curtain across the interior of said column forming a barrier therein, means for drawing off below said curtain gases from said column poor in combustible material, means for drawing off a second stream of gas below said curtain rich in combustible material, a combustion chamber communicating with said last-mentioned means for burning said latter mentioned gas, a wet scrubbing column, and means for passing said hot gases from the combustion chamber and said gases poor in combustible material into the lower portion of said scrubbing column, means within said scrubbing column for washing blended gases with a liquid, and means for returning at least a portion of the cleansed gases for introduction into said gaseous curtain.

2. The structure of claim 1, in which the hot gases are passed through a heat exchanger interposed between said combustion chamber and scrubbing column to heat atmospheric air, and means for passing said heated air into the lower portion of the cupola.

3. The structure of claim 1, in which means are provided for introducing liquid into said wet scrubbing column near the lower portion of the column.

4. In apparatus of the character set forth for use in combination with a cupola having a hollow column, a flange extending partially across said column, means for forming a gaseous curtain across said column adjacent said flange to provide a barrier to the rise of combustion products therebeyond, conduit means for withdrawing products of combustion poor in combustible material from a point below said flange, a wet scrubbing column, means for introducing said products of combustion into the lower portion of said scrubbing column, a second exhaust conduit below said first-mentioned conduit means and adapted to withdraw products of combustion rich in combustible material, a combustion chamber in communication with said exhaust conduit, a heat exchanger, means for passing the products of combustion from said combustion chamber into said heat exchanger and thence into the lower portion of said scrubbing column, means for washing the gases blended in said scrubbing column to cleanse the same, and means for returning a portion of the cleansed gases for re-use in said gaseous curtain-forming means.

5. The structure of claim 4, in which there is provided a conduit for conveying blast air in heat exchange relation with said hot gases in said exchanger and for delivering the same into the lower portion of the cupola.

6. In a process for treating cupola gases, the steps of withdrawing an upper stream of gas poor in combustible material, withdrawing a lower stream of gas rich in combustible matter, burning the latter gases to produce a further stream of hot gases, cooling the latter gases, combining said latter gases with said stream of gases poor in combustible material, washing the combined gases, and discharging a portion of the combined gases across the cupola to form a gaseous curtain above said point of withdrawal of gases effective to provide a barrier to the upward flow of cupola gases.

7. In a process for treating cupola gases, the steps of withdrawing a stream of gases rich in combustible material, burning said gases in the presence of oxygen, cooling said gases by passing atmospheric air in a restricted stream in heat exchange relation therewith, whereby said air is heated, passing said heated air into the lower portion of said cupola, washing said cooled gases with liquid, and introducing a portion of the washed gases into said cupola above said point of withdrawal of the gases rich in combustible material to form a gaseous curtain across said cupola effective to provide a barrier to the upward flow of cupola gases.

8. In a process for the purposes set forth for treating the gases of a cupola, the steps of discharging gases across said cupola to form a gaseous barrier therein effective to limit the flow of cupola gases therebeyond, withdrawing at spaced vertical points below said barrier two streams of gas from said cupola, introducing the upper stream into a liquid-washing zone, introducing the second stream into a combustion zone, adding oxygen to said combustion zone to consume combustible material in said second stream, thereby forming hot gases, cooling said gases by heat exchange relation thereof with atmospheric air, and introducing said cooled gases into said washing zone to blend said gases in said upper stream of gases.

9. The process of claim 8, in which said atmospheric air, after being heated, is introduced into the cupola below said spaced vertical points.

10. The process of claim 9, in which a portion of said blended gases from said washing zone after the washing thereof are reutilized in forming said gaseous curtain.

11. In apparatus of the character set forth in which a cupola is connected by a conduit to a heat exchanger for passing hot combustion gases thereinto and in which air is preheated in the heat exchanger for return to the tuyeres of the cupola, a bleed-in gate communicating with the upper portion of the heat exchanger for admitting air thereto to dilute the hot gases of combustion before they pass through the heat exchanger.

12. In apparatus of the character set forth in which a cupola is provided with a draw-off conduit for receiving a stream of gas rich in combustible material, a combustion chamber for burning said material, a wet scrubbing column, a heat exchanger communicating with said combustion chamber for receiving products of combustion from said combustion chamber and equipped with means for directing the same to said scrubbing column, conduit means associated with said heat exchanger for directing preheated air from the same to said cupola, a bleed-in air gate supported in the upper portion of said heat exchanger, and thermostat means in said conduit means for returning preheated air to said cupola for controlling said bleed-in gate for admitting air into the heat exchanger to dilute the hot gases in said heat exchanger to control the temperature of the preheated air entering said cupola.

13. In cupola apparatus providing a hollow column having an open top, means for discharging gas into said column intermediate the ends thereof to provide a gaseous curtain thereacross, an exhaust duct communicating with the interior of said column below said curtain for conveying hot gases rich in combustible material from the column, a combustion chamber communicating with said duct for burning said hot gases drawn from said column, a heat exchanger adapted to receive the hot gases from said combustion chamber and being adapted also to receive blast air and pass the same in heat exchange relation with the hot gases to heat the blast air, means for discharging heated blast air into said column, a liquid scrubbing column, means for passing gases from said heat exchanger and into said scrubbing column, and means for recycling at least a portion of the gases cleansed in said scrubbing column to the gas curtain providing means.

References Cited in the file of this patent

UNITED STATES PATENTS

| | | |
|---|---|---|
| 32,840 | Muller | July 16, 1861 |
| 519,530 | Fulton | May 8, 1894 |
| 1,085,096 | Berglof | Jan. 20, 1914 |
| 1,435,119 | Hohl | Nov. 7, 1922 |
| 1,750,850 | Mantle et al. | Mar. 18, 1930 |